Sept. 26, 1944. E. K. NEWTON 2,359,239
ELECTRICAL INSULATING SECTION FOR METALLIC CONDUITS
Filed May 25, 1942

INVENTOR.
Evans K. Newton
BY
Kenneth E. Stuart
ATTORNEY.

Patented Sept. 26, 1944

2,359,239

UNITED STATES PATENT OFFICE 2,359,239

ELECTRICAL INSULATING SECTION FOR METALLIC CONDUITS

Evans K. Newton, Niagara Falls, N. Y., assignor to Hooker Electrochemical Company, Niagara Falls, N. Y., a corporation of New York Application May 25, 1942, Serial No. 444,493

2 Claims. (Cl. 285—14)

My invention relates more particularly to insulating sections for metallic conduits connected to active metallic electrode compartments of electrolytic cells, such as alkali halogen cells, and carrying away therefrom hot gases, such as hydrogen, saturated with moisture and carrying traces of conductive substance, such as caustic alkali.

In the operation of electrolytic alkali halogen cells it is customary to connect them in electrical series and the number of cells in the series may be such that a difference of potential of 300 volts exists between the two ends of the circuit. In the cathode compartments of such cells hydrogen and aqueous caustic alkali are produced simultaneously. The hydrogen bubbles vigorously through the solution of caustic alkali, which may be at 90° C., and issues at that temperature saturated with moisture carrying traces of caustic alkali. It is customary to carry the hydrogen away to an iron header pipe through iron connecting pipes formed with vertical legs to permit refluxing and provided with sections of non-conducting material, such as rubber or glass. This method of collecting the hydrogen has heretofore been satisfactory; but there has now arisen a tendency to extend such circuits so that the potential between the ends of the circuit may be as much as 750 volts. The inner surface of the insulating glass tubes are wet with alkaline condensate and under these conditions flash-over through the glass tube is liable to occur. The object of my invention is to prevent this by improving the insulating properties of the tubular glass insulating sections. I accomplish this object in simple manner that will be better understood by reference to the drawing, in which;

Figure 1:
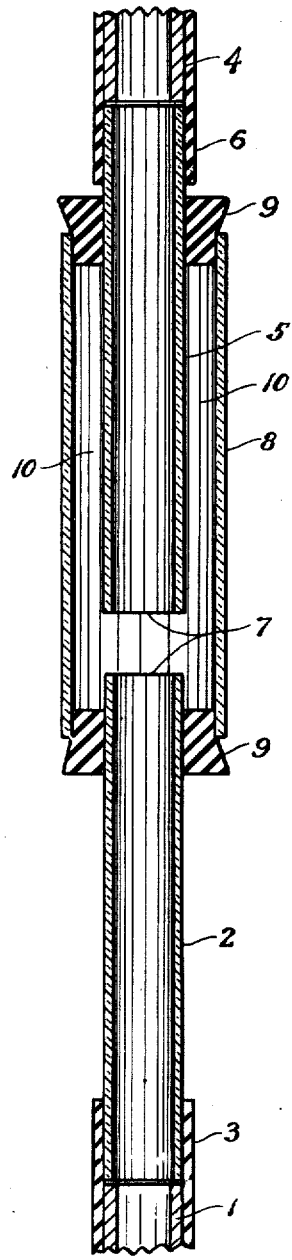
Fig. 1 is a sectional elevation of the simplest form of my invention.

Referring to Fig. 1, 1 is a portion of the metallic conduit leading from the cell (not shown); 2 is a section of conduit or tube, which may be of non-conducting material, connected to conduit 1 as by rubber sleeve 3 and forming a continuation of conduit 1. 4 is a portion of the metallic conduit connected to the main header (not shown). 5 is a section of conduit or tube similar to tube 2, which may also be of non-conducting material, forming a continuation of conduit 4 and connected thereto as by rubber sleeve 6. Conduit sections 2 and 5 preferably extend vertically and in co-axial alignment, with their ends separated by insulating gap 7. Portions of tubes 2 and 5 on each side of gap 7 are enclosed by jacket 8. This is also preferably of non-conducting material and co-axial with conduits 2 and 5. The clearance between jacket 8, on the one hand, and tubes 2 and 5, on the other, is therefore of circular annular cross section and readily closed at its ends, as by rubber stoppers 9. Jacket 8 therefore forms with stoppers 9 and tubes 2 and 5 a gas and liquid tight chamber or enclosure 10 extending around gap 7. In the construction described, the gas passes directly from tube 2 to tube 5. The gas in the annular space between tube 5 and jacket 8 is therefore quiescent, and by placing these tubes in a perpendicular position, with tube 5 above tube 2, as in the drawing, the condensate may be caused to drip from tube 5 directly into tube 2. The condensate is therefore prevented from wetting the surfaces of chamber 10 and thereby forming a conductive path from the tip of tube 5 to the end of tube 2. In almost any inclined position, with tube 5 uppermost, the same result is secured to a greater or less extent, but the vertical is obviously the position in which, for a given length, chamber 10 is most effective. However, in cases where this position is impracticable, adequate insulation can be obtained by lengthening chamber 10. This construction has been found to be very effective in preventing the flash-overs referred to.

Various modifications of the construction illustrated will suggest themselves to any person skilled in the art. For instance, if jacket 8 is of non-conducting material, tubes 2 and 5 may be of metal, and vice versa, provided chamber 10 is long enough to remain substantially dry inside. It is however essential that either jacket 8 or tube 5 be non-conducting.

If preferred, upper tube 5 may be the inlet tube and lower tube 2 the exit, but in that case the header (not shown) into which tube 2 would drain would have to be located below the insulating section and provided with a means for separating and bleeding off the condensate from the gas.

Figure 2:
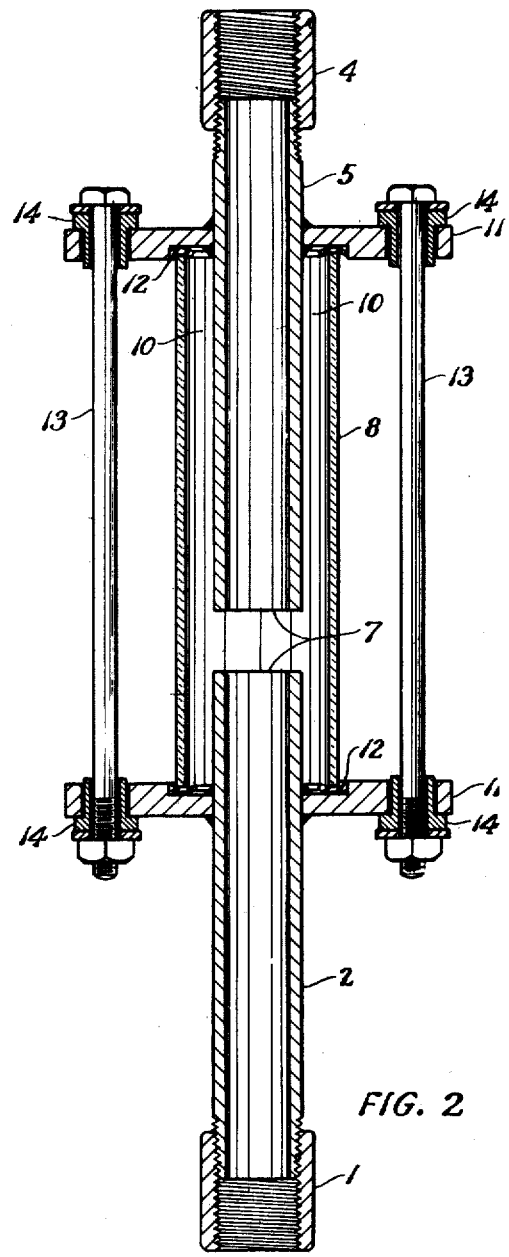
Fig. 2 is a sectional elevation of a modified form of my invention.

If mechanical strength is needed in the insulating section, this may be provided as illustrated in Fig. 2. In this figure, tubes 2 and 5 are of metal and jacket 8 of non-conducting material. Jacket 8 may be secured in position in any desired manner, as by providing tubes 2 and 5 with flanges 11, which may be welded thereto, and clamping jacket 8 between the flanges, with washers 12 between, by means of bolts 13, which may be insulated from flanges 11 by sleeves 14. However, when the header is supported overhead and conduit 4 is supported therefrom and conduit 1 supported by and close to the cell, no mechanical strength is needed beyond that provided by the construction of Fig. 1.

I claim as my invention:

1. In a system of electrolytic cells for production of chlorine and caustic alkali from an aqueous electrolyte, provided with means for passing electric current therethrough and from cell to cell between electrodes of alternate polarity and for collecting in a common conductive header through a conduit leading to said header from each individual cell hydrogen evolved upon the cathode thereof and laden with moisture forming in said conduits condensate rendered conducting by caustic alkali in solution therein, an electrically insulating section for said conduit comprising a chamber having non-conducting walls forming a gas and liquid-tight closure with adjoining portions of said conduit, one portion of said conduit communicating with said chamber at the lower part thereof, the other portion of said conduit entering said chamber at the upper part thereof, projecting downward therein for a substantial distance and terminating in an open end a substantial distance above the bottom of said chamber with a clear gap between, the non-conducting walls of the upper part of said chamber surrounding the entering portion of said conduit being substantially spaced therefrom to form therewith a quiescent space the walls of which remain unwetted by condensate.

2. In a system of electrolytic cells for production of chlorine and caustic alkali from an aqueous electrolyte, provided with means for passing electric current therethrough and from cell to cell between electrodes of alternate polarity and for collecting in a common conductive header through a conduit leading to said header from each individual cell hydrogen evolved upon the cathode thereof and laden with moisture forming in said conduits condensate rendered conducting by caustic alkali in solution therein, an electrically insulating section for said conduit comprising a chamber having non-conducting walls forming a gas and liquid-tight closure with adjoining portions of said conduit, one portion of said conduit communicating with said chamber at the lower part thereof, the other portion of said conduit entering said chamber at the upper part thereof, projecting vertically downward therein for a substantial distance and terminating in an open end square with its axis a substantial distance above the bottom of said chamber with a clear gap between, the non-conducting walls of the upper part of said chamber surrounding the entering portion of said conduit being substantially spaced therefrom to form therewith a quiescent space the walls of which remain unwetted by condensate.

EVANS K. NEWTON.